(12) United States Patent
Morishita

(10) Patent No.: US 11,065,544 B2
(45) Date of Patent: Jul. 20, 2021

(54) TERMINAL DEVICE, PROGRAM, METHOD, AND SERVER APPARATUS

(71) Applicant: GungHo Online Entertainment, Inc., Tokyo (JP)

(72) Inventor: Kazuki Morishita, Tokyo (JP)

(73) Assignee: GungHo Online Entertainment, Inc.

( * ) Notice: Subject to any disclaimer, the term of this patent is extended or adjusted under 35 U.S.C. 154(b) by 0 days.

(21) Appl. No.: 16/715,445

(22) Filed: Dec. 16, 2019

(65) Prior Publication Data

US 2020/0398162 A1 Dec. 24, 2020

Related U.S. Application Data

(63) Continuation of application No. PCT/JP2019/024977, filed on Jun. 24, 2019.

(51) Int. Cl.
*A63F 13/58* (2014.01)
*A63F 13/537* (2014.01)
*A63F 13/35* (2014.01)

(52) U.S. Cl.
CPC .............. *A63F 13/58* (2014.09); *A63F 13/35* (2014.09); *A63F 13/537* (2014.09)

(58) Field of Classification Search
None
See application file for complete search history.

(56) References Cited

U.S. PATENT DOCUMENTS

| 7,749,056 | B2 * | 7/2010 | Ando | A63F 13/53 |
| | | | | 463/6 |
| 7,780,530 | B2 * | 8/2010 | Ushiro | A63F 13/795 |
| | | | | 463/42 |

(Continued)

FOREIGN PATENT DOCUMENTS

| JP | 2007-502658 A | 2/2007 |
| JP | 2014-068720 A | 4/2014 |

(Continued)

OTHER PUBLICATIONS

Published by: Yasuyuki Sagami, "Wonder Life Special", Pokemon X-Y, Fastest Clear Guide, Tokyo, Japan, First Edition Publication, Oct. 22, 2013, pp. 26 and 27, with English translation.

(Continued)

*Primary Examiner* — Ronald Laneau
(74) *Attorney, Agent, or Firm* — Harness, Dickey & Pierce, P.L.C.

(57) ABSTRACT

A terminal device includes a input interface, a display configured to display a virtual space of a game application, a memory, a sensor configured to detect position information about a player, and a processor configured to execute an instruction command stored in the memory to select a desired player character from one or a plurality of player characters in response to an instruction input received by the input interface, to select a desired candidate character from one or a plurality of candidate characters in response to the instruction input to be associated with the selected desired player character, and to display a movement of the selected desired player character on the display so that the selected desired player character moves in accordance with a movement of the selected desired candidate character in the virtual space.

12 Claims, 13 Drawing Sheets

(56) References Cited

U.S. PATENT DOCUMENTS

| | | | |
|---|---|---|---|
| 8,506,410 B2 * | 8/2013 | Fujisawa | A63F 13/56 463/42 |
| 8,821,290 B2 * | 9/2014 | Fujisawa | A63F 13/12 463/42 |
| 9,782,668 B1 | 10/2017 | Golden et al. | |
| 2004/0209680 A1 * | 10/2004 | Oyamada | G06T 13/40 463/31 |
| 2019/0015741 A1 | 1/2019 | Morishita | |

FOREIGN PATENT DOCUMENTS

| | | |
|---|---|---|
| JP | 2017-006663 A | 1/2017 |
| WO | WO-2019-012683 A1 | 1/2019 |

OTHER PUBLICATIONS

4Gamer.net, "Yokai-Watch World", Beginner's Guide, Published by Bandai Namco Entertainment, Tokyo, Japan, Jun. 28, 2018, pp. 1-12, with English translation.

* cited by examiner

FIG. 5A

| PLAYER ID | PLAYER NAME | LEVEL | MOVEMENT DISTANCE | PLAYER CHARACTER | TRANSFER DESTINATION | POSITION | AREA |
|---|---|---|---|---|---|---|---|
| U1 | A | ADVANCED | 5km | C1 | C4 | (N1,E1) | A1 |
| U2 | B | INTERMEDIATE | 100km | C2 | - | (N2,E2) | A2 |
| U3 | C | BEGINNER | 250km | C3 | - | (N3,E3) | A3 |
| U4 | D | ADVANCED | 8km | C4 | - | (N4,E4) | A1 |
| U5 | E | INTERMEDIATE | 95km | C5 | N1 | (N5,E5) | A5 |
| ... | ... | ... | ... | ... | ... | ... | ... |

FIG. 5B

| PLAYER CHARACTER ID | ATTACK POWER | HIT POINT | NUMBER OF TIMES | TIME | TOTAL TIME | DISTANCE |
|---|---|---|---|---|---|---|
| C1 | 50 | 300 | 3 | T1 | P1 | 50km |
| C2 | 100 | 250 | - | - | - | - |
| C3 | 20 | 520 | - | - | - | - |
| C4 | 250 | 250 | - | - | - | - |
| C5 | 120 | 400 | - | - | - | 10km |
| ... | ... | ... | ... | ... | ... | ... |

FIG. 5C

| AREA ID | NUMBER OF PLAYERS |
|---|---|
| A1 | 2 |
| A2 | 12 |
| A3 | 10 |
| A4 | 0 |
| A5 | 20 |
| ... | ... |

| NP CHARACTER ID | MOVEMENT INFORMATION | | | APPEARANCE COUNT |
| --- | --- | --- | --- | --- |
| | DESTINATION | MOVEMENT ROUTE | MOVEMENT TIME | |
| N1 | A5 | L1 | S1 | 1 |
| N2 | A10 | L2 | S2 | 3 |
| ... | ... | ... | ... | ... |

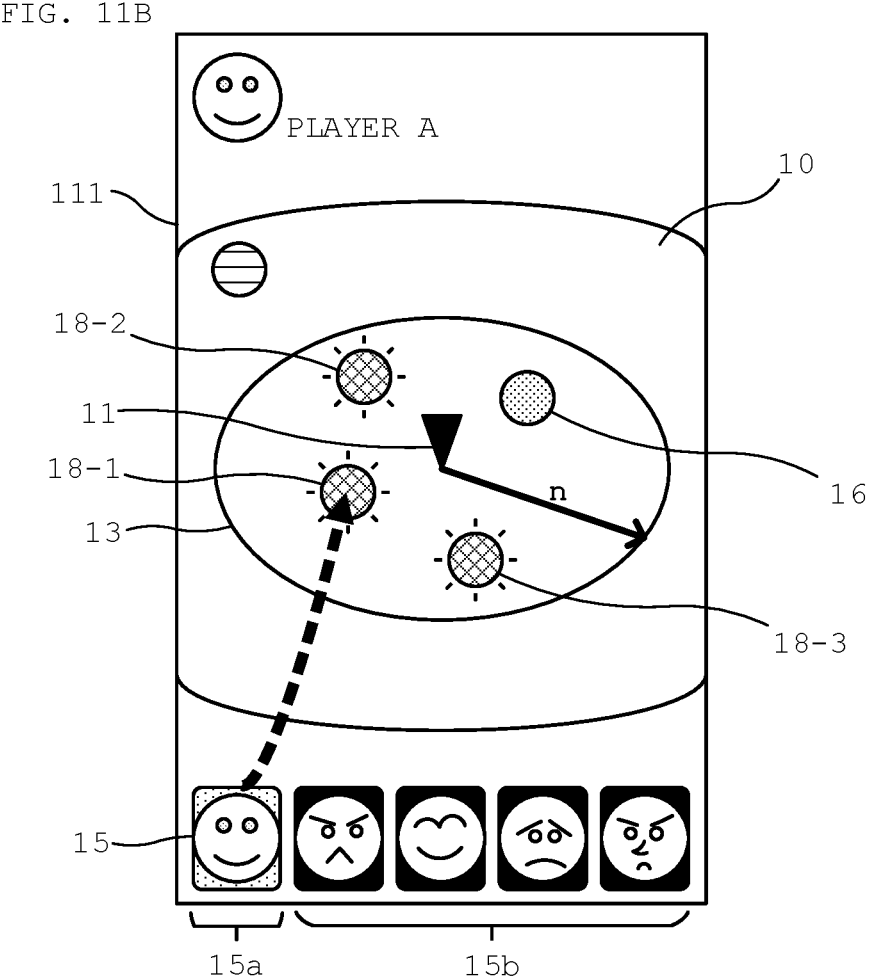

TERMINAL DEVICE, PROGRAM, METHOD, AND SERVER APPARATUS

CROSS-REFERENCE TO RELATED APPLICATIONS

The present application is a continuation application of International Application No. PCT/JP2019/024977, filed on Jun. 24, 2019, which is expressly incorporated herein by reference in its entirety.

BACKGROUND

1. Technical Field

The present disclosure relates to a terminal device, a program, a method, and a server apparatus for executing an application the progress of which involves use of position information about a player.

2. Related Art

Conventionally, game applications have been known in which items such as characters usable in a game are exchangeable between a player and another player. For example, JP 2017-006663 A discloses a system in which a game item purchased by a first user is given to a second user who is a friend of the first user, and an incentive is provided to the first user who has given the game item.

SUMMARY

Therefore, based on the above-described technology, various embodiments of the present disclosure provide a terminal device, a program, a method, and a server apparatus for executing a new application featuring cooperation with another player using position information about the player.

An aspect of the present disclosure provides "a terminal device including: an input interface that receives an instruction input from a player; a display configured to display a virtual space; a memory configured to store, in addition to a predetermined instruction command, information about one or a plurality of player characters operable by the player; a sensor configured to detect position information about the player; a communication interface configured to transmit the position information detected by the sensor to a server apparatus remotely arranged, and receive information about one or a plurality of candidate characters identified based on the position information from the server apparatus; and a processor configured to execute the instruction command stored in the memory to select a desired player character from the one or plurality of player characters in accordance with the instruction input received by the input interface, to select a desired candidate character from the one or plurality of candidate characters in accordance with the instruction input received by the input interface to be associated with the player character selected, and to display a content on the display so that the selected player character moves in accordance with a movement of the selected candidate character in the virtual space".

An aspect of the present disclosure provides "a program causing a computer including an input interface that receives an instruction input from a player, a display configured to display a virtual space, a memory configured to store information about one or a plurality of player characters operable by the player, a sensor configured to detect position information about the player, and a communication interface configured to transmit the position information detected by the sensor to a server apparatus remotely arranged, and receive information about one or a plurality of candidate characters identified based on the position information from the server apparatus, to function as a processor configured to execute processing of selecting a desired player character from the one or plurality of player characters in accordance with the instruction input received by the input interface, selecting a desired candidate character from the one or plurality of candidate characters in accordance with the instruction input received by the input interface to be associated with the player character selected, and displaying a content on the display so that the selected player character moves in accordance with a movement of the selected candidate character in the virtual space".

An aspect of the present disclosure provides "a method performed in a computer including an input interface that receives an instruction input from a player, a display configured to display a virtual space, a memory configured to store, in addition to a predetermined instruction command, information about one or a plurality of player characters operable by the player, a sensor configured to detect position information about the player, and a communication interface configured to transmit the position information detected by the sensor to a server apparatus remotely arranged, and receive information about one or a plurality of candidate characters identified based on the position information from the server apparatus, when a processor executes the instruction command, the method including: selecting a desired player character from the one or plurality of player characters in accordance with the instruction input received by the input interface; selecting a desired candidate character from the one or plurality of candidate characters in accordance with the instruction input received by the input interface to be associated with the player character selected; and displaying a content on the display so that the selected player character moves in accordance with a movement of the selected candidate character in the virtual space".

An aspect of the present disclosure provides "a server apparatus including: a communication interface configured to receive position information detected by a terminal device held by a player, from the terminal device; a memory configured to store, in addition to a predetermined instruction command, the received position information and information about one or a plurality of player characters of the player, in association with the player; and a processor configured to identify one or a plurality of candidate characters from a plurality of characters based on the position information, transmit information about the one or plurality of candidate characters identified to the terminal device, receive information about a desired player character selected by the player from the one or plurality of player characters, receive information about a desired candidate character selected by the player from the one or plurality of candidate characters, associate the received player character and the received candidate character with each other, and execute the instruction command stored in the memory so that the received player character moves in accordance with a movement of the received candidate character in a virtual space".

According to various embodiments of the present disclosure, it is possible to provide a terminal device, a program, a method, and a server apparatus for executing a new application featuring cooperation with another player using position information of the player.

The above effect is merely an example for the convenience of description and are not limiting. In addition to or in place of the above effect, any of the effects described in the present disclosure or an effect obvious to those skilled in the art can be obtained.

BRIEF DESCRIPTION OF THE DRAWINGS

FIG. 5A is a diagram schematically illustrating a player table stored in the server apparatus according to the first embodiment of the present disclosure. FIG. 5B is a diagram schematically illustrating a player character table stored in the server apparatus according to the first embodiment of the present disclosure. FIG. 5C is a diagram schematically illustrating an area table stored in the server apparatus according to the first embodiment of the present disclosure.

FIG. 11B is a diagram illustrating an example of a screen displayed on the display of the terminal device according to the first embodiment of the present disclosure.

DESCRIPTION OF EXEMPLARY EMBODIMENTS

Figure 1A:
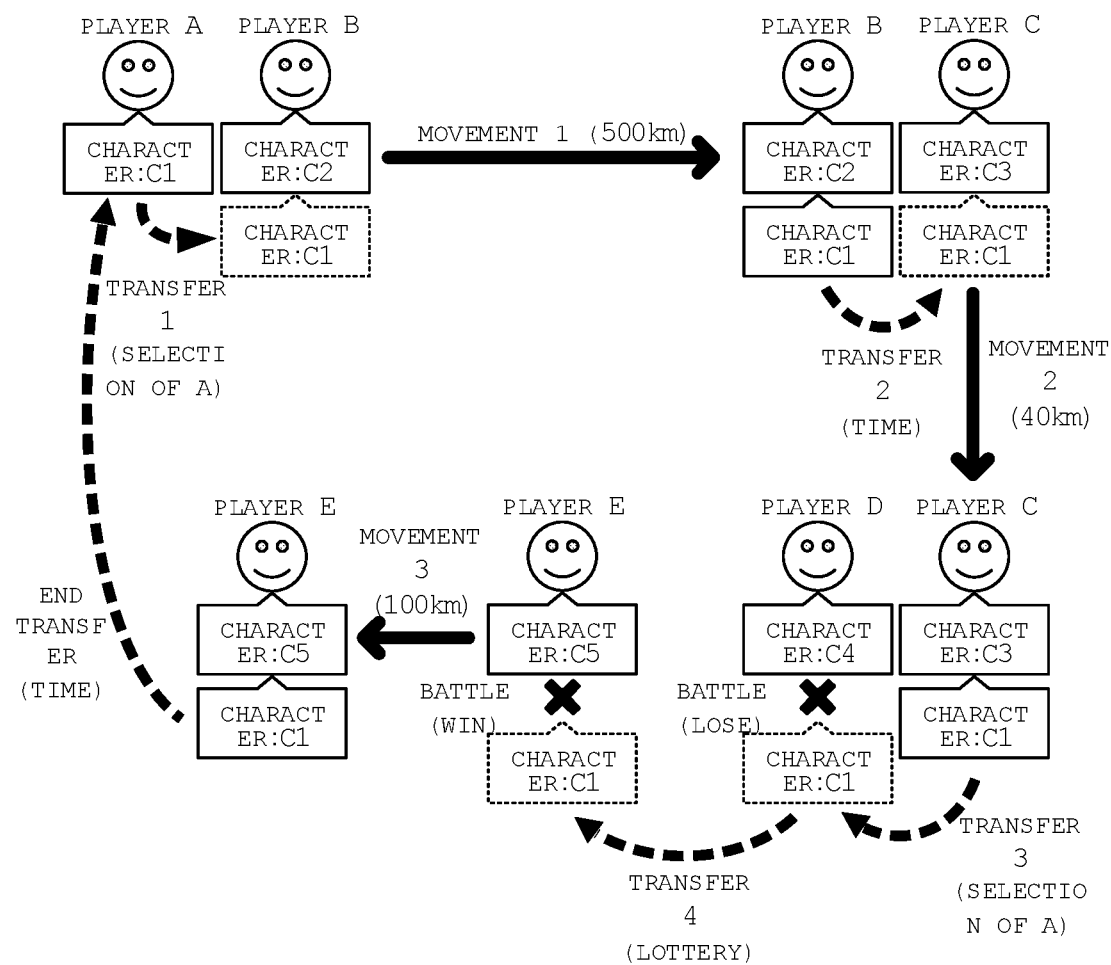
FIG. 1A is a diagram schematically illustrating a progress of an application according to various embodiments of the present disclosure.

Various embodiments of the present disclosure will be described with reference to the accompanying drawings. Note that the same components in the figures are denoted with the same reference numerals.
Overview of Application Related to the Present Disclosure An example of an application according to various embodiments of the present disclosure includes an application in which a player him or herself transfers an item he or she virtually owns to another player, and a parameter value of the item changes in accordance with a distance moved by the other player in the real world.

Typical examples of such an application include game applications such as a battle game in which a plurality of characters battle, a block break game, a puzzle game, a role playing game, and a sport game. Hereinafter, an overview of the application according to the present embodiment will be described by using a battle game as an example.

FIG. 1A is a diagram schematically illustrating a progress of an application according to various embodiments of the present disclosure. According to FIG. 1A, first of all, a player character C1, operated by the player A, is selected by the player A to be virtually transferred to a player B (transfer 1). Next, the player B moves to a certain position in the real world, while being virtually accompanied by his or her player character C2 and the player character C1 transferred (movement 1). Then, at the destination of the movement, the player character C1 transfers again from the player B to the player C in response to a predetermined event (transfer 2). Next, the player C moves to a certain position in the real world, while being virtually accompanied by his or her player character C3 and the player character C1 transferred (movement 2). Then, at the destination of the movement, the player character C1 transfers again from the player C to the player D in response to a predetermined event (transfer 3). In this case, a selection by the player D causes a virtual battle between the transferred player character C1 and a player character C4 of the player D. When the player character C1 loses, the player character C1 cannot keep staying at the player D as the transfer destination, and transfers to a player E (transfer 4). Then, a selection by the player E causes a virtual battle between the transferred player character C1 and a player character C5 of the player E. When the player character C1 wins, the player character C1 stays at the player E as the transfer destination. Next, the player E moves to a certain position in the real world, while being virtually accompanied by his or her player character C5 and the player character C1 transferred (movement 3). When a second period elapses after the first transfer (transfer 1), the transfer ends and the character returns to the original player A.

In the application, the virtual character C1 of the player A can repeatedly transfer to various players in response to various events. At a transfer destination, an ability value of the character C1 may be changed in accordance with the distance (for example, a sum of the movements 1 to 3) moved together with the transfer target player.

In other words, the way the player A sees it, in the above application, his or her player character C1 can "travel" with another player, to be strengthened in accordance with the distance of the "travel".

Figure 1B:
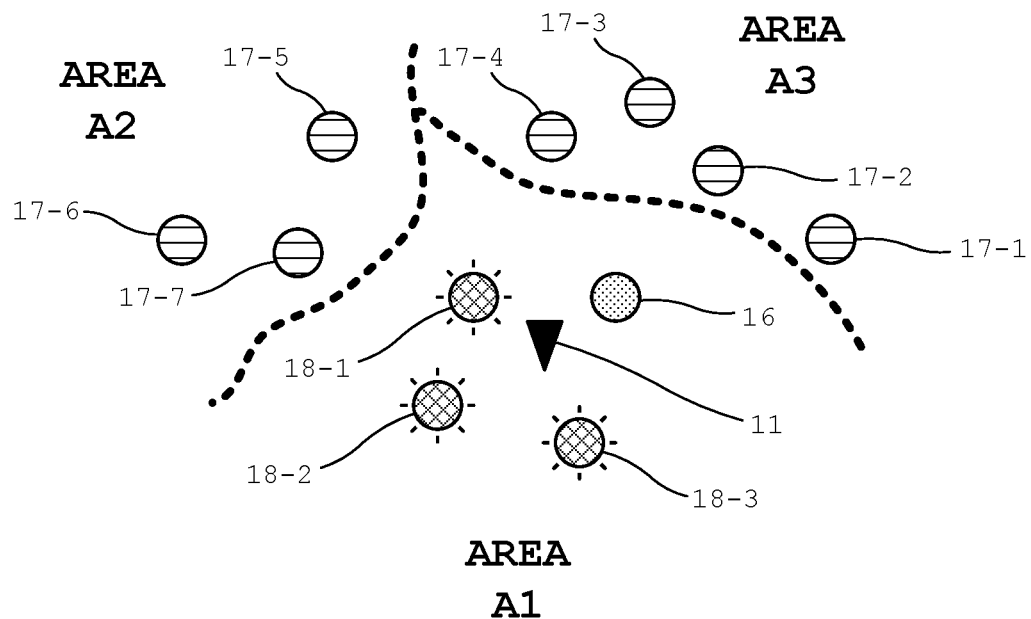
FIG. 1B is a diagram schematically illustrating a virtual space generated in an application according to various embodiments of the present disclosure.

FIG. 1B is a diagram schematically illustrating a virtual space generated in an application according to various embodiments of the present disclosure. According to FIG. 1B, for example, another player 16 exists in the periphery of the current location of the player 11 who is the transfer source. In the application according to the present disclosure, each player as a transfer destination is selected from players (for example, the other player 16) located within a predetermined range (for example, an area A1) identified based on position information about the transfer source player. Therefore, if there are more other players around the transfer source player, there are more options of the transfer source player meaning that there are more opportunities for the transfer. On the other hand, when there are not many other players around the transfer source player, there are few opportunities for transfer, and this may have a negative impact on the feature of the application.

In the present disclosure, non-player characters (for example, non-player characters 18-1 to 18-3) appear in the virtual space according to the number of other players located around the player as the transfer source, so that the opportunities for the transfer can be guaranteed. For example, in the example illustrated in FIG. 1B, position information about the player 11 that is a transfer source is detected, and the position information is transmitted to a server apparatus. Based on the position information, the server apparatus identifies the area A1 in which the player 11 that is the transfer source is located. Then, the server apparatus counts the number of other players (for example, the other player 16) located in the identified area A1, and based on the number of other players, determines whether to make a non-player character appear. When it is determined, in the server apparatus, to make the non-player characters (for example, non-player characters 18-1 to 18-3) appear, the non-player characters are each displayed on a terminal device as one of the candidate characters of the transfer destination. On the other hand, when it is determined, in the server apparatus, not to make the non-player character appear, only the other players in the area including the player are displayed on the terminal device as the candidate characters of the transfer destination.

In the application described above, "transfer" and/or "virtually transfer" is implemented. These terms mean that a character ID of the character that has been stored in association with player identification information about the transfer source player in a player table is stored in association with a player identification information about the transfer destination player, through processing such as copy or rewrite. In the case where the character is transferred again from the "transfer destination player" to the "new transfer destination player", the character ID associated with the player identification information about the "transfer destination player" may be completely deleted, or may be kept associated.

Furthermore, "player character" means a virtual character associated with player identification information of a certain player. On the other hand, "non-player character" means a virtual character that is not associated with the player identification information of the certain player at least at the time of appearance. Note that there may be virtual characters with the same outer appearance/form, and operating as a player character and as a non-player character.

In the present disclosure, a virtual space formed in the application is typically associated with the real space in the real world. Therefore, position information about a player detected in the real space is associated with a certain position in the virtual space.

First Embodiment

Figure 2:
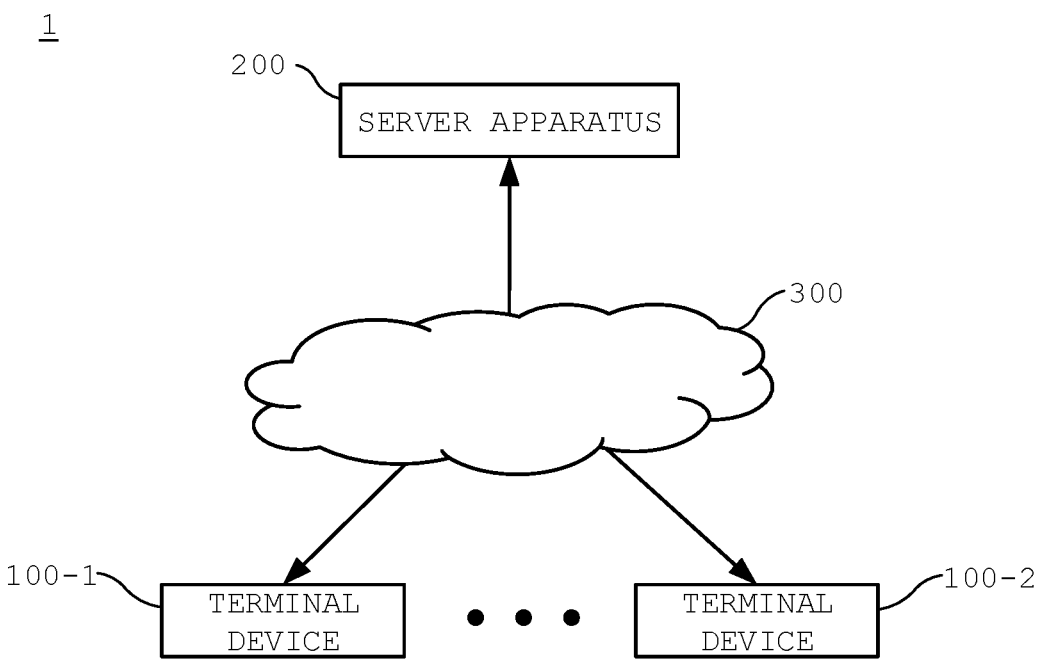
FIG. 2 is a schematic diagram schematically illustrating a configuration of a system according to a first embodiment of the present disclosure.

1. Configuration of System 1 According to the First Embodiment of the Present Disclosure FIG. 2 is a schematic diagram schematically illustrating the configuration of a system 1 according to the first embodiment of the present disclosure. Referring to FIG. 2, system 1 includes a plurality of terminal devices 100 including at least a terminal device 100-1 and a terminal device 100-2, and a server apparatus 200 communicably connected to the terminal devices 100 through a network 300. In the system 1, the server apparatus 200 and the terminal device 100 execute a program stored in a memory to execute processing of the application according to the present embodiment. The server apparatus 200 and the terminal device 100 communicate with each other as appropriate to transmit and receive various types of information (for example, FIGS. 5A to 5D), programs, and the like necessary for the progression of the application.

Although only two terminal devices 100 are illustrated in the example of FIG. 2, it is a matter of course that three or more terminal devices 100 may be included. Also, although the server apparatus 200 is illustrated as a single apparatus, the components and the processing of the server apparatus 200 may be distributed to and executed in cooperation by a plurality of server apparatuses.

2. Configuration of Terminal Device 100

Figure 3:
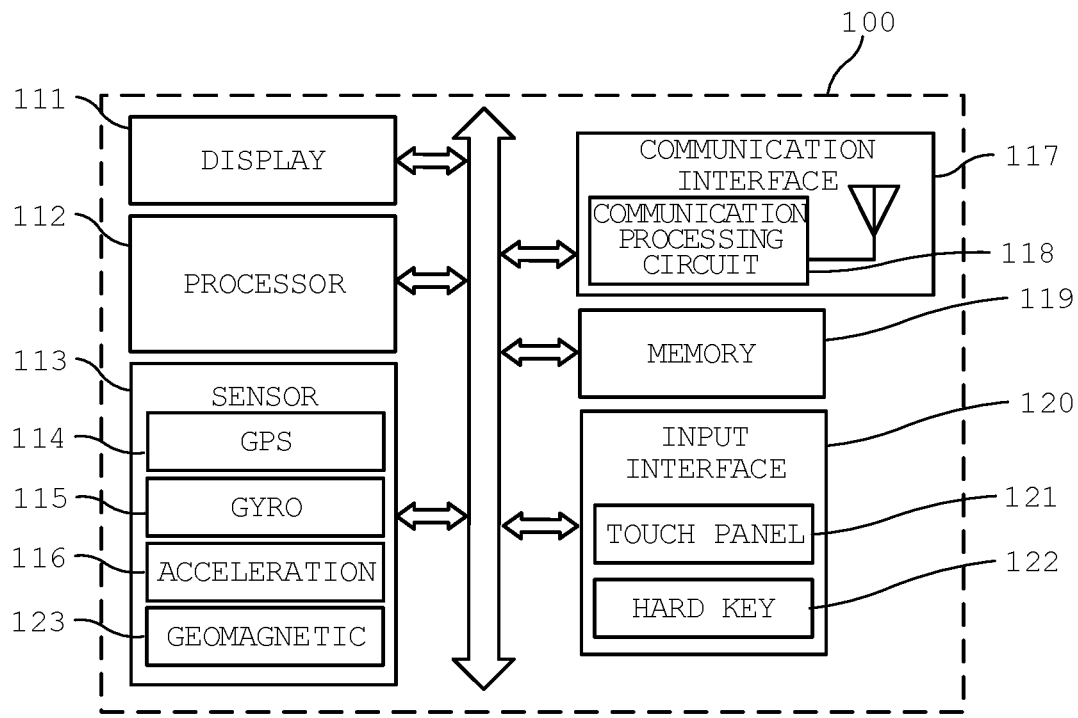
FIG. 3 is a block diagram illustrating an example of a configuration of a terminal device according to the first embodiment of the present disclosure.

FIG. 3 is a block diagram illustrating an example of a configuration of the terminal device 100 according to the first embodiment of the present disclosure. The terminal device 100 does not necessarily need to include all of the components illustrated in FIG. 3, and can have a configuration in which the components are partially omitted. Furthermore, additional components may also be provided.

The terminal device 100 may be, for example, a portable terminal device, typically a smartphone, capable of performing wireless communications. Yet, the present invention can be suitably applied to devices other than this, such as a portable game machine, a feature phone, a portable information terminal, a personal digital assistant (PDA), and a laptop personal computer. In addition, the plurality of terminal devices 100 of the system 1 may not necessarily be the same or of the same type. For example, the terminal device 100-1 may be a smartphone, and the terminal device 100-2 may be a portable game machine.

According to FIG. 3, the terminal device 100 includes: a display 111; a processor 112; a sensor 113 including a GPS sensor 114, a gyro sensor 115, an acceleration sensor 116, and a geomagnetic sensor 123; a communication interface 117 including a communication processing circuit 118 and an antenna; a memory 119 at least including random access memory (RAM), read only memory (ROM), non-volatile memory (in some cases, a hard disk drive (HDD)), or the like; and an input interface 120 including a touch panel 121 and a hard key 122. These components are electrically connected to each other through control lines and data lines.

The display 111 serves as a display unit that reads out image information stored in the memory 119 in response to an instruction from the processor 112, and displays various contents including a virtual space formed by the application according to the present embodiment (for example, FIG. 11A, FIG. 11B, FIG. 12, and FIG. 13). The display 111 includes, for example, a liquid crystal display and an organic electroluminescence (EL) display.

The input interface 120 includes the touch panel 121, the hard key 122 and/or the like, and receives various instructions and inputs from the player. The touch panel 121 is disposed so as to cover the display 111, and outputs, to the processor 112, information about position coordinates corresponding to image data displayed by the display 111. Known techniques can be used for the touch panel, including resistive film, electrostatic capacitance coupling, and ultrasonic surface acoustic wave. In the present embodiment, the touch panel 121 detects a swipe operation and/or a tap operation on each item displayed on the display 111 using indicators.

The processor 112 includes a central processing unit (CPU) (microcomputer), and functions as a control unit that controls other components connected thereto, based on various programs stored in the memory 119. Specifically, the processor 112 reads a program for executing the application according to the present embodiment or a program for executing an OS from the memory 119 and executes the program. Also, the processor 112 generates various types of operation information based on an output from the input interface 120. In the present embodiment, in particular, the processor 112 executes processing of causing the display 111 to display at least one of a non-player character and a player character of another player, in accordance with the number of other players positioned in a predetermined range determined based on position information detected by the sensor 113; processing of selecting as a transferred character, a player character desired by the player, from one or a plurality of player characters in accordance with an instruction input received on the input interface 120; processing of selecting as a transfer destination character, a candidate character desired by the player, from one or a plurality of candidate characters in accordance with an instruction input received on the input interface 120 to be associated with the player character selected; and processing of causing the display 111 to perform displaying so that the selected player character moves in accordance with a movement of the candidate character selected as the transfer destination. The processor 112 may be formed by a single CPU, and may also be formed by a plurality of CPUs. Furthermore, other types of processors such as a GPU specialized for image processing may be combined as appropriate.

The memory 119 is formed by ROM, RAM, non-volatile memory, an HDD, and the like, and functions as a storage unit. The ROM stores, as a program, an instruction for executing an application or an OS according to the present embodiment. The RAM is a memory used for writing and reading data while a program stored in the ROM is being processed by the processor 112. The non-volatile memory is a memory to and from which data is written and read in response to the execution of the program. The data written thereto is stored even after the execution of the program has ended. In the present embodiment, in particular, the memory 119 stores a program for causing the processor 112 to execute processing of causing the display 111 to display at least one of a non-player character and a player character of another player, in accordance with the number of other players positioned in a predetermined range determined based on position information detected by the sensor 113; processing of selecting as a transferred character, a player character desired by the player, from one or a plurality of player characters in accordance with an instruction input received on the input interface 120; processing of selecting as a transfer destination character, a candidate character desired by the player, from one or a plurality of candidate characters in accordance with an instruction input received on the input interface 120 to be associated with the player character selected; and processing of causing the display 111 to perform displaying so that the selected player character moves in accordance with a movement of the candidate character selected as the transfer destination. Further, in the memory 119, position information detected by the sensor 113, information about one or a plurality of player characters operable by the player, and the like are stored in association with player identification information for identifying the player.

The communication interface 117 functions as a communication unit that transmits/receives information to/from the server apparatus 200 or another terminal device remotely installed, via the communication processing circuit 118 and the antenna. The communication processing circuit 118 executes processing for receiving a program for executing the application according to the present embodiment, various types of information used in the application, and the like from the server apparatus 200, in accordance with the progress of the application. In addition, processing for transmitting a processing result, obtained by the execution of the application, to the server apparatus 200 is performed. In the present embodiment, in particular, the position information stored in the memory 119 is transmitted to the server apparatus 200, and information about one or a plurality of candidate characters identified based on the position information is received from the server apparatus 200.

The communication processing circuit 118 is processed based on a broadband wireless communication method a typical example of which including Wideband-Code Division Multiple Access (W-CDMA) method. Alternatively, it may be processed based on a scheme related to narrow band wireless communications, such as a wireless local area network (LAN) or Bluetooth (registered trademark) represented by IEEE 802.11. Alternatively, wired communications may be used instead of or in addition to wireless communications.

The sensor 113 includes the GPS sensor 114, the gyro sensor 115, the acceleration sensor 116, and the geomagnetic sensor 123. The GPS sensor 114 detects the current position of the terminal device 100 by communicating with a plurality of satellites. The detected position information is transmitted to the server apparatus 200 via the communication circuit under the control of the processor 112. In the present embodiment, the sensor 113 detects the current position. However, the present invention is not limited to this, and any current location information such as information about a Wi-Fi access point or a base station of broadband wireless communications can be used.

3. Configuration of Server Apparatus 200

Figure 4:
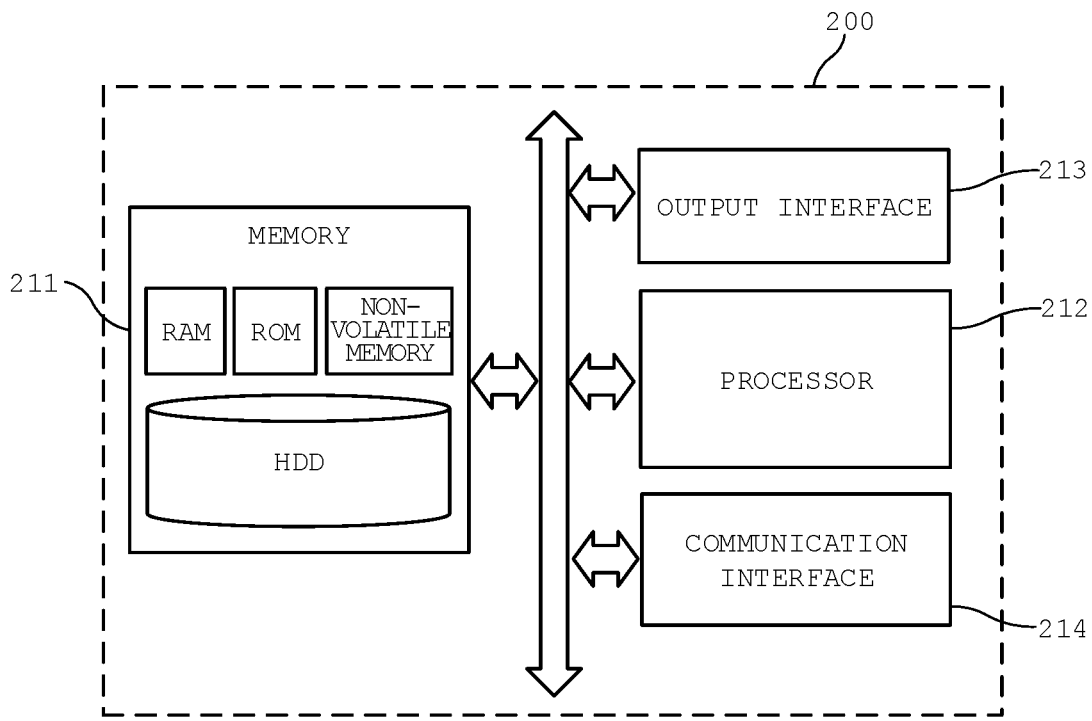
FIG. 4 is a block diagram illustrating an example of a configuration of a server apparatus according to the first embodiment of the present disclosure.

FIG. 4 is a block diagram illustrating an example of a configuration of the server apparatus 200 according to the first embodiment of the present disclosure. The server apparatus 200 does not necessarily need to include all of the components illustrated in FIG. 4, and can have a configuration in which the components are partially omitted. Furthermore, additional components may also be provided.

Referring to FIG. 4, the server apparatus 200 includes a memory 211 including RAM, ROM, non-volatile memory, an HDD and the like, a processor 212 including a CPU and the like, an output interface 213, and a communication interface 214. These components are electrically connected to each other through control lines and data lines.

The memory 211 includes RAM, ROM, non-volatile memory, and an HDD, and functions as a storage unit. The memory 211 stores, as a program, an instruction for executing an application or an OS according to the present embodiment. Such programs are loaded and executed by the processor 212. Furthermore, the memory 211 stores a player table, a player character table, an area table, and a non-player character table as illustrated in FIGS. 5A to 5D. Further, the memory (the RAM in particular) is temporarily used for writing and reading data while the program is executed by the processor 212. In the present embodiment, in particular, the memory 211 stores a program causing the processor 212 to execute: when the communication interface receives the position information detected by the terminal device 100 held by the player from the terminal device 100 processing, processing of identifying the other players positioned in a predetermined range based on the received position information, with reference to the player table;

processing of determining whether to make a non-player character appear in accordance with the number of other players identified; when determined to make the non-player character appear, processing of transmitting to the terminal device 100, information about a character to be a candidate of the transfer destination including the non-player character; when determined not to make the non-player character appear, processing of transmitting information about a player character associated with the other player identified, as a candidate character; processing of receiving from the terminal device 100, information about a player character selected from player characters of the player holding the terminal device 100; processing of receiving information related to the candidate character actually transferred selected from the candidate characters transmitted; processing of associating the candidate character with the player character received; and processing of moving the player character in accordance with the movement of the received candidate character in the virtual space.

The processor 212 includes a CPU (microcomputer), and functions as a control unit that controls other components connected thereto, based on various programs stored in the memory 211. In the present embodiment, in particular, the processor 212 controls, by referring to various types of information (FIGS. 5A to 5D) stored in the memory 211: when the communication interface 214 receives the position information detected by the terminal device 100 held by the player from the terminal device 100 processing, processing of identifying the other players positioned in a predetermined range based on the received position information, with reference to the player table; processing of determining whether to make a non-player character appear in accordance with the number of other players identified; when determined to make the non-player character appear, processing of transmitting to the terminal device 100, information about a character to be a candidate of the transfer destination including the non-player character; when determined not to make the non-player character appear, processing of transmitting information about a player character associated with the other player identified, as a candidate character; processing of receiving from the terminal device 100, information about a player character selected from player characters of the player holding the terminal device 100; processing of receiving information related to the candidate character actually transferred selected from the candidate characters transmitted; processing of associating the candidate character with the player character received; and processing of moving he player character in accordance with the movement of the received candidate character in the virtual space. The processor 212 may be formed by a single CPU, and may be also be formed by a plurality of CPUs.

For example, the communication interface 214 executes processing such as modulation and/or demodulation for transmitting and receiving a program, various types of information, and the like for executing the game application according to the present embodiment, to and from the terminal device 100 through the network 300 or to and from the other server apparatus through the network 300. The communication interface 214 communicates with each of the terminal devices and other server apparatuses in accordance with the above-described wireless communication scheme or a known wired communication scheme. In the present embodiment, position information of the player in the real world may be included as one of the received information pieces. For example, the position information may be any information such as coordinate information itself detected by the terminal device 100 held by each player and information related to an area identified from the coordinate information detected.

Although not elaborated in the figure, the output interface 213 functions as an information input/output unit for inputting/outputting information to/from various external devices such as a printer and a display. The output interface 213 can employ a known connection technique, such as a serial port, a parallel port, or USB, as desired.

4. Information Stored in Memory of Server Apparatus 200

FIG. 5A is a diagram schematically illustrating the player table stored in the server apparatus 200 according to the first embodiment of the present disclosure. As one example, the player information table is stored in the HDD in the memory 211 of the server apparatus 200.

According to FIG. 5A, each of player name information, level information, movement distance information, player character information, transfer destination information, position information, and area information is stored in association with the player ID (player identification information). The "player ID (player identification information)" is unique information given to each player, and is information for identifying each player. The "player name" indicates a name used by each player in the application. The "level" is information indicating the skill level of each player in executing the application. For example, depending on the parameter value such as the experience value acquired during execution of the application, a level such as a beginner, intermediate, or advanced level is given. Although the levels are classified according to the parameter values, the parameter values may also be directly used as the levels. The "movement distance" is information indicating the distance moved by each player within a predetermined period, based on the received position information. In the present embodiment, this information is used for processing of giving a reward according to the movement distance of the transfer destination player. The "player character" is one of "items" in the present embodiment, and indicates one or a plurality of virtual characters operable by the player. Here, a unique player character ID (player character identification information) assigned to each player character is stored as the player character information. The "transfer destination information" indicates the current transfer destination of the player character associated with the player ID. Specifically, since the player character C1 of the player A in FIG. 5A is transferred to the player D, the player character ID (C4) of the player D is stored in association with the player character C1. On the other hand, for example, in the case of a player character C5 that has the player ID "U5" and is transferred to a non-player character, a non-player character ID (N1) is stored in association with the character C5. The information is updated as appropriate each time a transfer occurs. The "position information" is information indicating the current location of each player. The information is updated as appropriate, with the present position information, detected by each terminal device, received. Further, the information is used, for example, when calculating "distance information" about a character.

FIG. 5B is a diagram schematically illustrating the player character table stored in the server apparatus 200 according to the first embodiment of the present disclosure. As one example, the player character table is stored in the HDD in the memory 211 of the server apparatus 200.

According to FIG. 5B, information is stored in association with the player character ID (character identification information) and includes ability parameters such as attack power and hit points, number of times, time, total time, and distance. Although not elaborated in the figure, other information can be stored including ability parameters such as defense power and recovery power of each character, equipment items, and the like. The "player character ID" is unique information given to each character, and is information for identifying each character. The "attack power" is one of the ability values, and is a parameter used to calculate the damage given to the character or the like who will be the opponent at the time of attack by the character. The "hit point" is a parameter that is decremented by a predetermined amount according to a damage received. The hit point of the character being zero means that a unit game is processed as "lose" or that the use of the character is restricted. The "number of times information" indicates the number of times the character has transferred to another player. The value of this information is reset to zero when the transfer ends. The "time information" indicates a period of time elapsed after the character has been associated with the player currently stored as the transfer destination information in FIG. 5A. Thus, each time a new player ID is associated as transfer destination information, the time information is reset to zero and starts to be counted from zero. The "total time information" indicates a period of time elapsed after the character has been first associated with another player ID. Thus, once the transfer ends, the total time information is reset to zero, and starts to be counted from zero when a new transfer starts. The "distance information" is calculated based on the current position information about the player to which the character has been transferred. Specifically, the information is calculated based on the current position information (FIG. 5A) measured by the terminal device held by the player who has performed the transferring. The distance is accumulated while the player moves together with the charter transferred thereto. The accumulation of the distance information starts when the first transfer is performed and ends when the transfer ends. Thus, when the transfer ends after the character has transferred to a plurality of players one by one, the sum of the moving distances of the respective players is stored as the distance information.

FIG. 5C is a diagram schematically illustrating the area table stored in the server apparatus 200 according to the first embodiment of the present disclosure. As one example, the area table is stored in the HDD in the memory 211 of the server apparatus 200.

According to FIG. 5C, the number-of-players information is stored in association with an area ID (area identification information). The "area ID" is unique information given to each area, and is information for identifying each area. In the present embodiment, each area in the virtual space is formed in association with the real space in the real world. For example, each area in the virtual space is generated in association with each district in the real space such as municipality and/or a prefecture. The "number of players" is information for identifying the number of players (or player characters) located in each area. The number of players is counted based on the area information (FIG. 5A) identified based on the position information (FIG. 5A) about the terminal device of each player. In addition, each of the areas forming the virtual space is associated with an area (municipality and prefecture) forming the real space as mentioned above. Therefore, the number of players is the number of players located in each area in the real space, and is also the number of player characters virtually arranged in each area of the virtual space corresponding to each area in the real space.

Figures 5D, 6:
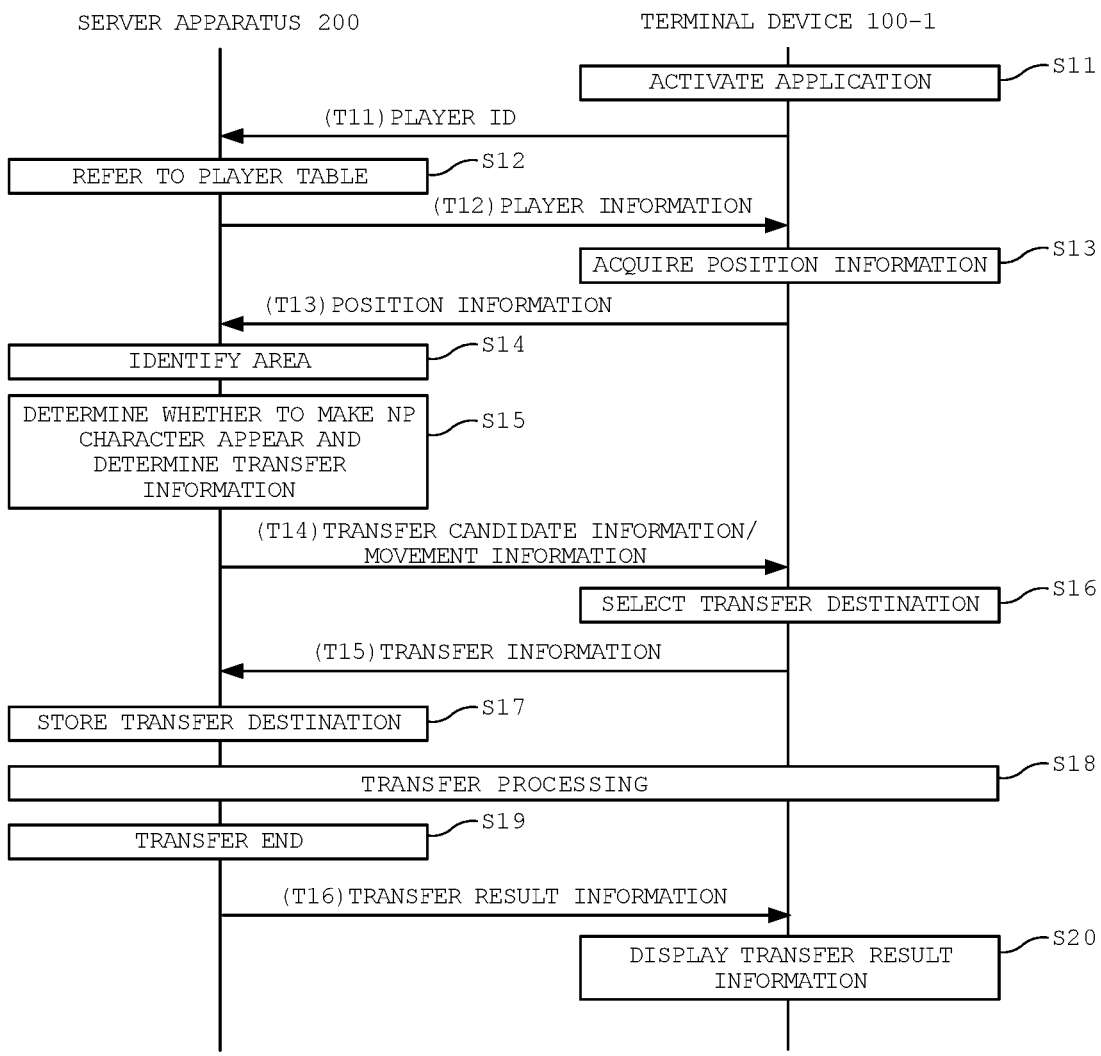
FIG. 5D is a view schematically illustrating a non-player character table stored in the server apparatus according to the first embodiment of the present disclosure.
FIG. 6 is a diagram illustrating a sequence of processing between the terminal device and the server apparatus according to the first embodiment of the present disclosure.

FIG. 5D is a diagram schematically illustrating the non-player character table stored in the server apparatus 200 according to the first embodiment of the present disclosure. As one example, the non-player character table is stored in the HDD in the memory 211 of the server apparatus 200.

According to FIG. 5D, movement information such as a destination, movement route, movement time, and the like and appearance count information are stored in association with the non-player character ID (identification information). The "non-player character ID" is unique information given to each non-player character, and is information for identifying each non-player character. The "movement information" is information in which destination information, movement route information, movement time information, and the like about a non-player character identified by each non-player character ID are set. Among these, "destination information" is information for identifying an area which is a final destination of movement of each non-player character. The "movement route information" is information for identifying a movement route to the destination area. Specifically, the information is for identifying areas passed through while moving from the appearing area to the destination area. The "movement time information" is information for identifying the time required for moving to the next area. For example, the movement information stored includes information indicating that the area A1 is the appearing area, information indicating that an area A7 is the destination, information indicating that the movement route is "area A1→area A4→area A3→area A7", the movement time information as "moving to next area once in every 3 hours", and the like. In the present embodiment, when the determination is made to make a non-player character appear, the movement information is determined in advance by the server apparatus 200 so as to satisfy a predetermined condition, and the information is transmitted to the terminal device 100 as the movement information. Then, when the non-player character is selected as the transfer destination on the terminal device 100, the non-player character is displayed as if it is actually moving according to the received movement information. The "appearance count information" is information indicating the number of times each non-player character has appeared as a transfer destination candidate within a predetermined period. For example, the number of times the non-player character has appeared in one day is counted, and the resultant value is updated to zero each time the date changes.

5. Sequence of Processing Between Terminal Device 100 and Server Apparatus 200

FIG. 6 is a diagram illustrating a sequence of processing between the terminal device 100-1 and the server apparatus 200 according to the first embodiment of the present disclosure. Specifically, FIG. 6 illustrates a sequence of processing executed between the terminal device 100-1 held by the player (player A in FIG. 1A) that transfers the player character and the server apparatus 200.

According to FIG. 6, when the application according to the present embodiment is activated in the terminal device 100-1 (S11), the player ID is transmitted to the server apparatus 200 (T11). When the server apparatus 200 receives the player ID, the processor 212 of the server apparatus 200 performs control to refer to the player table (S12), and transmits player information corresponding to the player ID (information in the player table stored in association with the player ID) to the terminal device 100-1 (T12). When the terminal device 100-1 receives the player information, the terminal device 100-1 acquires position information from the sensor 113, and transmits the position information to the server apparatus 200 (T13). Upon receiving the position information, the server apparatus 200 identifies an area in which the terminal device 100-1 is located based on the position information (S14). Next, the server apparatus 200 determines whether to make the non-player character appear in accordance with the number of other players located in the identified area (S15). Then, when it is determined to make the non-player character appear, a lottery for determining movement information about the non-player character is performed (S15). Information (transfer candidate information) about the player character and/or the non-player character to be the transfer candidate, and/or the movement information is transmitted to the terminal device 100-1, in accordance with a result of the determination in S15 (T14). The processor 112 of the terminal device 100-1 displays a map screen including the current position of the player A and the candidate characters as transfer candidates on the display 111, and selects the candidate character (the player character of the player B in FIG. 1A) for transferring the player character C1 of the player A in accordance with an instruction input by the player A (S16). Then, the processor 112 of the terminal device 100-1 transmits information about the selected candidate character to the server apparatus 200 as the transfer information (T15).

The server apparatus 200 that has received the information thus transmitted stores information about the transfer destination, identified by the received transfer information, in the player table in an updating manner (S17). Specifically, as illustrated in the player table, the player character ID or the non-player character ID for identifying the candidate character of the transfer destination is stored in association with the player character C1 of the player A. Then, when transfer to any of the player characters occurs, one of the processes related to transfer 2 to transfer 4 is performed between each of the terminal devices including the terminal device 100-1 and the server apparatus 200 as illustrated in FIG. 1A (S18). Then, processing is executed to end the transfer in accordance with the elapse of the total time information stored in FIG. 5B (S19). When transferring to a non-player character occurs, processing based on predetermined movement information is executed between the server apparatus 200 and the terminal device 100-1 (S18), and then, the transfer is terminated (S19). After the transfer has been terminated, the player A is given a reward according to the distance traveled during that time. Transfer result information including information about the benefit and the like is transmitted to the terminal device 100-1 (T16). The processor 112 of the terminal device 100-1 executes processing of displaying the received transfer result information (S20).

Figure 7:
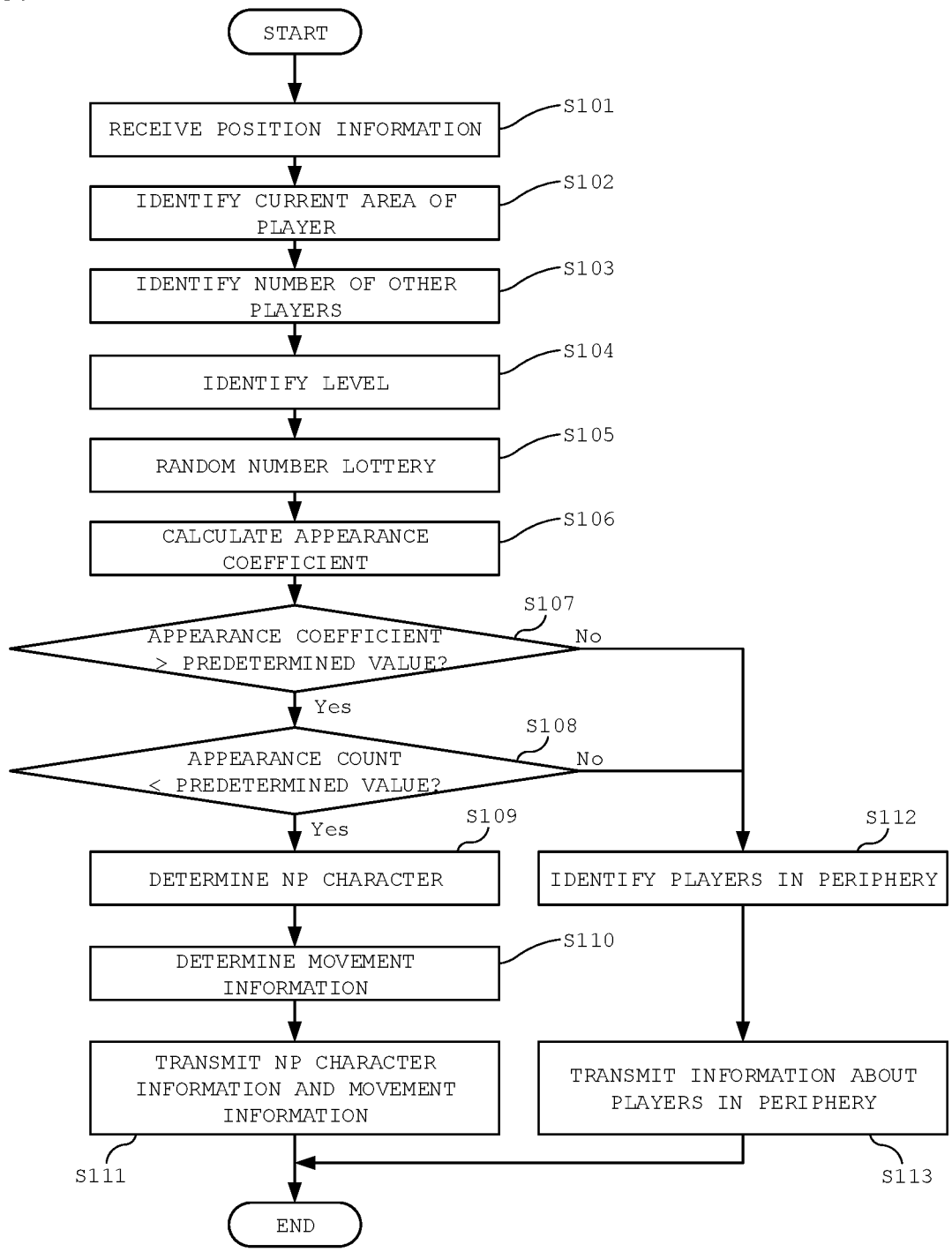
FIG. 7 is a diagram illustrating a flow of processing executed by the server apparatus according to the first embodiment of the present disclosure.

6. Flow of Processing Executed by Server Apparatus 200 Processing Related to Determining Whether to Make Non-Player Character Appear FIG. 7 is a diagram illustrating a flow of processing executed by the server apparatus 200 according to the first embodiment of the present disclosure. Specifically, a flow of processing is illustrated in which the processor 212 of the server apparatus 200 reads and executes the program stored in the memory 211, in a period between the reception of the position information from the terminal device 100-1 and transmission of the transfer candidate information including information about the candidate character as the transfer candidate to the terminal device 100-1 in the sequence of the processing illustrated in FIG. 6. In the following, processing executed with the terminal device 100-1 of the player A illustrated in FIG. 1A, FIG. 1B, FIG. 5A, and the like will be described.

Referring to FIG. 7, the processing starts when the position information detected by any of the terminal devices 100 including the terminal device 100-1 is received from the terminal device 100 (S101). Upon receiving the position information, the processor 212 executes processing to store the position information in association with the player ID in the player table (FIG. 5A). Then, the processor 212 identifies, based on the received position information, the area A1, defined in advance in the real space in the real world, where the player is located or the area A1 in the virtual space associated with the area (S102).

Then, the processor 212 executes processing for determining whether to make the non-player character appear. Specifically, the number of other players located in the identified area A1 is identified based on each position information stored in the area table (FIG. 5C) (S103). Furthermore, the processor 212 refers to the player table (FIG. 5A) and identifies the level (advanced) of the player A based on the player ID identifying the player A received together with the position information (S104). Further, the processor 212 performs a random number lottery, and selects a coefficient applied to the number of other players identified and/or the level of the player A (S105). Then, using the respective values obtained in S103 to S105, calculation of an appearance coefficient for determining whether or not to make the non-player character appear is performed (S106).

The appearance coefficient is calculated, for example, by solving the following formula.

[Math. 1]

$$\text{Appearance coefficient} = N*L*R \qquad \text{[Formula I]}$$

N: a coefficient according to the number of other players located in the identified area, L: a coefficient according to the level of the identified player, and R: a coefficient according to the random number extracted.

The coefficient according to the number of other players located in the identified area is, for example, "2.0" if the number of other players is 1 to 10, "1.3" if the number is 11 to 50, and "1.0" if the number is 51 or more. Thus, a coefficient set in advance in accordance with the number of people is used. Moreover, the coefficient according to the level of the player, for example, is "1.5" for the beginner level, "1.2" for the intermediate level, and "1.0" for the advanced level. Thus, the coefficient set in advance in accordance with the level of the player is used. Also, the coefficient according to the extracted random number is "1.5" if the extracted random number using the random number counter with the number from 0 to N is 0 to 10, "1.3" if the number is 11 to 50, and is "1.0" if the number is 51 to N. Thus, the coefficient set in advance in accordance with the random number is used.

The above formula is merely an example, and any formula may be used as long as processing according to the number of players is executed. Furthermore, although not particularly described in the above-mentioned formula, for example, a coefficient related to the distance moved, in the real space in the real world, by the other player in the identified area in the predetermined period (for example, the previous day) may be further used. In the present embodiment, a reward according to the distance moved to another player is given. However, if a record of movement of the other player who is a transfer destination candidate is poor, the transfer is less likely to result in the reward. Therefore, it is possible to provide a relief for a situation where there are only other players with a poor moving record, by taking the record of the movement of the other player in a predetermined period into consideration.

The processor 212 determines whether the calculated appearance coefficient exceeds a predetermined value (S107). If the coefficient does not exceed the predetermined value, it means that a sufficient number of other players as transfer destination candidates exist in the area A1 including the player A. Therefore, in this case, the processor 212 refers to the player table (FIG. 5A) and identifies other players located in the area A1 including the player A (S112). Then, with reference to the player table (FIG. 5A), information about the player character of the identified other player is transmitted to the terminal device 100-1 as transfer candidate information (S113).

On the other hand, if the coefficient exceeds the predetermined value, it means that there may not be a sufficient number of other players as transfer destination candidates in the area A1 including the player A. Therefore, the processor 212 makes the non-player character appear in the area A1 and provides the non-player character to the player A as a transfer destination candidate character. The non-player character to appear may be selected by lottery from the virtual characters stored in the non-player character table (FIG. 5D), or may be determined in accordance with the calculated appearance coefficient.

In the present embodiment, the appearances count of the non-player character that can be the transfer destination candidate character is determined in advance. For example, the processor 212 refers to the non-player character table (FIG. 5D), and checks whether the appearance count of the non-player character to appear as a transfer destination candidate character in a predetermined period exceeds a predetermined value (for example, four times a day) (S108). For example, if the number of times exceeds the predetermined value, it may lead to too much relief. Thus, the identification of the other player (S112) and transmission of the information about the player character of the other player identified (S113) are performed without making the non-player character appear.

On the other hand, when the number of times does not exceed the predetermined value, the processor 212 determines a non-player character to appear as a candidate character from the virtual characters stored in FIG. 5D (S109). Next, the processor 212 determines movement information (FIG. 5D) about the determined non-player character, and stores the information in the non-player character table illustrated in FIG. 5D in an updating manner (determination of movement information will be described in detail with reference to FIG. 8). Then, the processor 212 transmits the information about the determined non-player character and the stored movement information to the terminal device 100-1 (S111). Although not elaborated in the figure, the processor 212 also stores the appearance count in the non-player character table in an updating manner. The appearance count is information managed to set a limit on the appearance count in a predetermined period. Therefore, the count is reset each time the predetermined period elapses.

Processing Related to Determination of Movement Information

Figure 8:
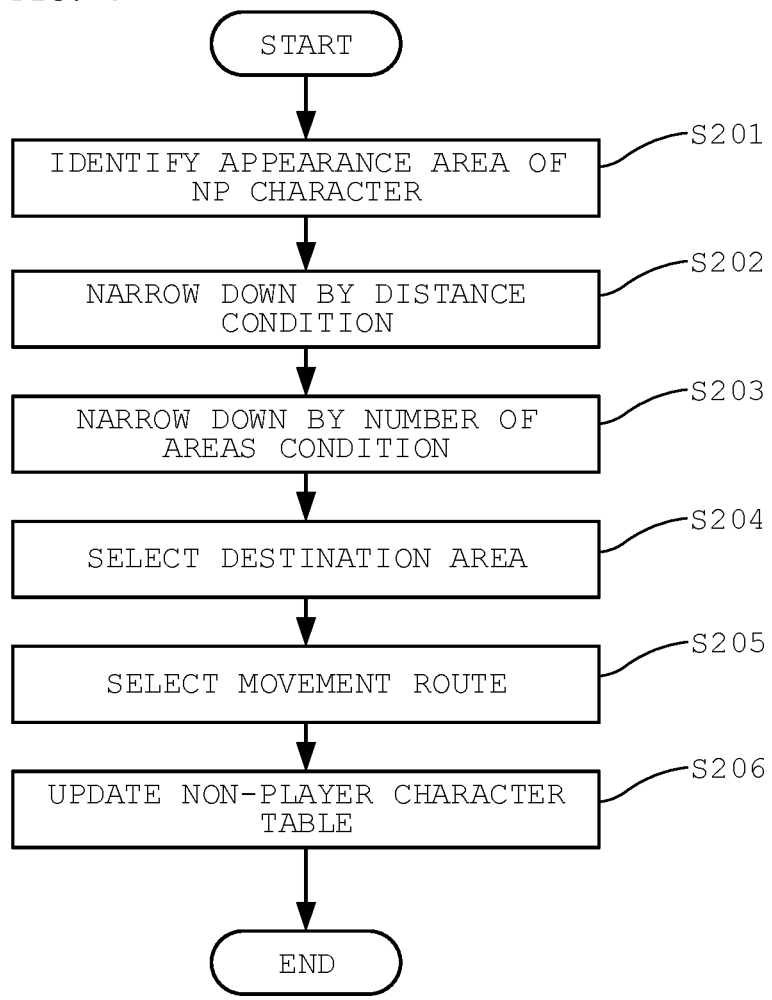
FIG. 8 is a diagram illustrating a flow of processing executed by the server apparatus according to the first embodiment of the present disclosure.

FIG. 8 is a diagram illustrating a flow of processing executed by the server apparatus 200 according to the first embodiment of the present disclosure. Specifically, a flow of processing of periodically reading and executing a program, stored in the memory 211, by the processor 212 of the server apparatus 200 in the step of determining the movement information of the non-player character described as S110 in FIG. 7 will be described.

According to FIG. 8, when it is determined to make the non-player character appear in S109 of FIG. 7, the processor 212 identifies an area where the non-player character appears, based on the position information about the player 11 received in advance (S201). Next, the processor 212 narrows down a plurality of areas to candidate areas of the destination, based on the distance condition (S202). Specifically, the processor 212 narrows down a plurality of areas to areas within a predetermined distance from the area identified in S201 in the real space. In addition, it is also possible to uniformly set the predetermined distance to a fixed value regardless of which area is identified in S201. However, in this case, the number of areas narrowed down largely depends on the size of the area identified in S201. Therefore, it is also possible to set the predetermined distance to be different among the areas.

Next, the processor 212 further narrows down the candidate areas narrowed down in S202 based on the number of areas condition (S203). Specifically, the processor 212 narrows down the plurality of areas to predetermined number of areas (four, for example) or less from the area identified in S201, or to areas involving the number of times the inter-area boundary is crossed (for example "four times") is within a predetermined range. As in the case of the distance condition of S202, the same range may be uniquely set as the condition regardless of which area is the area identified in S201, or the range condition may be set to be different among the areas.

Next, the processor 212 selects the destination from the destination candidate areas extracted by narrowing down in S202 and S203 (S204). The selection may be made based on a predetermined criterion, such as the farthest area in the candidates, the closest area in the candidates, and the like. Furthermore, the selection from the candidates may be made by random lottery. Furthermore, the selection may be made based on a combination of these.

When the destination area is selected, the processor 212 selects a movement route from the area specified in S201 to the destination area (S205). The movement route can be determined by a scheme appropriately selected from the cumulative movement distance, the number of areas or the number of times of crossing the inter-area boundaries, random lottery, and a combination of these. Then, the processor 212 associates the information about the destination selected in S204 and the movement route selected in S205 with the non-player character ID of the non-player character determined in S109 of FIG. 7, and stores the resultant information in the non-player character table in an updating manner. Then, the processing returns to S111 in FIG. 7. Although not elaborated in the figure, the non-player character is set to move to the next area once in every predetermined period of time (for example, three hours) in accordance with the selected movement route. This time may be a fixed time regardless of the destination area, or may be set in accordance with the number of areas or the number of times of crossing the inter-area boundaries. The set time is stored as movement time information in the non-player character table.

Figure 9:
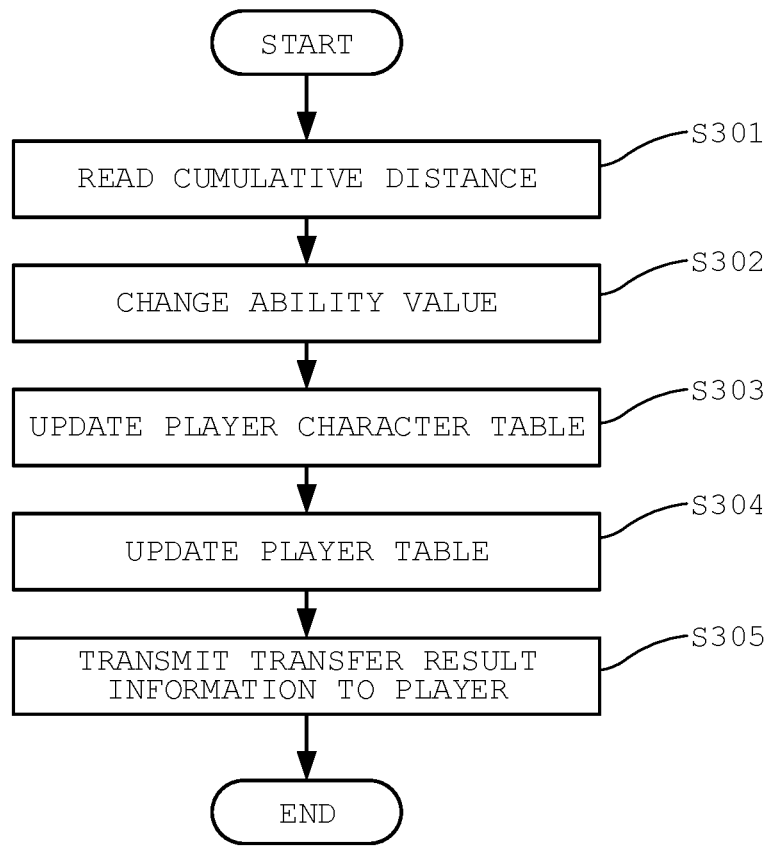
FIG. 9 is a diagram illustrating a flow of processing executed by the server apparatus according to the first embodiment of the present disclosure.

FIG. 9 is a diagram illustrating a flow of processing executed by the server apparatus 200 according to the first embodiment of the present disclosure. Specifically, a flow of processing of periodically reading and executing a program, stored in the memory 211, by the processor 212 of the server apparatus 200 in the step terminating the transfer in the sequence of processing illustrated in FIG. 6 is illustrated. In particular, processing executed when the player character C5 of the player E has transferred to the non-player character N1 will be described below.

In the present embodiment, when the determination is made to make a non-player character appear, the movement information is determined in advance by the server apparatus 200 so as to satisfy a predetermined condition, and the information is transmitted to the terminal device 100 as the movement information. Then, when the non-player character is selected as the transfer destination on the terminal device 100, the non-player character is controlled to move in accordance with the received movement information. At this time, as in the case of the transfer to the player character as illustrated in FIG. 1A, the transferring player character C5 can return to the player E when a predetermined period of time elapses or when an instruction input by the player E is detected while the character is moving together with the non-player character (thus, at a desired timing under the request from the player E). When the character returns due to the elapse of time, the movement distance and the number of times of movement in the real space are calculated in accordance with the movement route selected in S205 in FIG. 8, and the distance information and the number of times of movement information in the player character table are updated. On the other hand, when the character returns due to the detection of the instruction input by the player E, the distance and the number of times of movement on the movement route selected in S205 until the instruction input are calculated, and the distance information and the number of times of movement information in the player character table are updated. Then, referring to FIG. 9, the processor 212 first refers to the player character table to read information about the cumulative distance moved by the player character C5, transferred to the non-player character N1, together with the non-player character N1. Specifically, the processor 212 reads distance information in the player character table (S301). Next, processing of changing the ability value of the player character C5 is executed as a reward given in accordance with the cumulative distance read (S302).

For example, a distance on the virtual space associated with the real space is converted into the distance in the real space, and the movement of the player character C5 while being associated with the non-player character N1, that is, while being transferred to the non-player character N1 is identified to be 10 km (FIG. 5B). Therefore, the processor 212 changes each ability value of the character according to the following formula prepared in advance. The following formula is merely an example, and the ability value may be increased or decreased according to the movement distance, or another formula may be used:

Attack power=attack power before transfer+distance×1.5; and

Hit point=hit point before transfer+distance×0.5.

The processor 212 updates the ability value of the player character C5 in the player character table (FIG. 5B) with the ability value after the change calculated as above (S303). Furthermore, due to the termination of the transfer to the non-player character N1, the processor 212 updates the player table (FIG. 5A) to delete the identification information about the non-player character N1 from the transfer destination information (FIG. 5A) stored in association with the player character C5 and cancel the association (S304). Next, the processor 212 transmits transfer result information including the updated ability value and information about movement to the terminal device 100 held by the player E (S305), and ends the series of processing.

7. Flow of Processing Executed by Terminal Device 100

Figure 10:
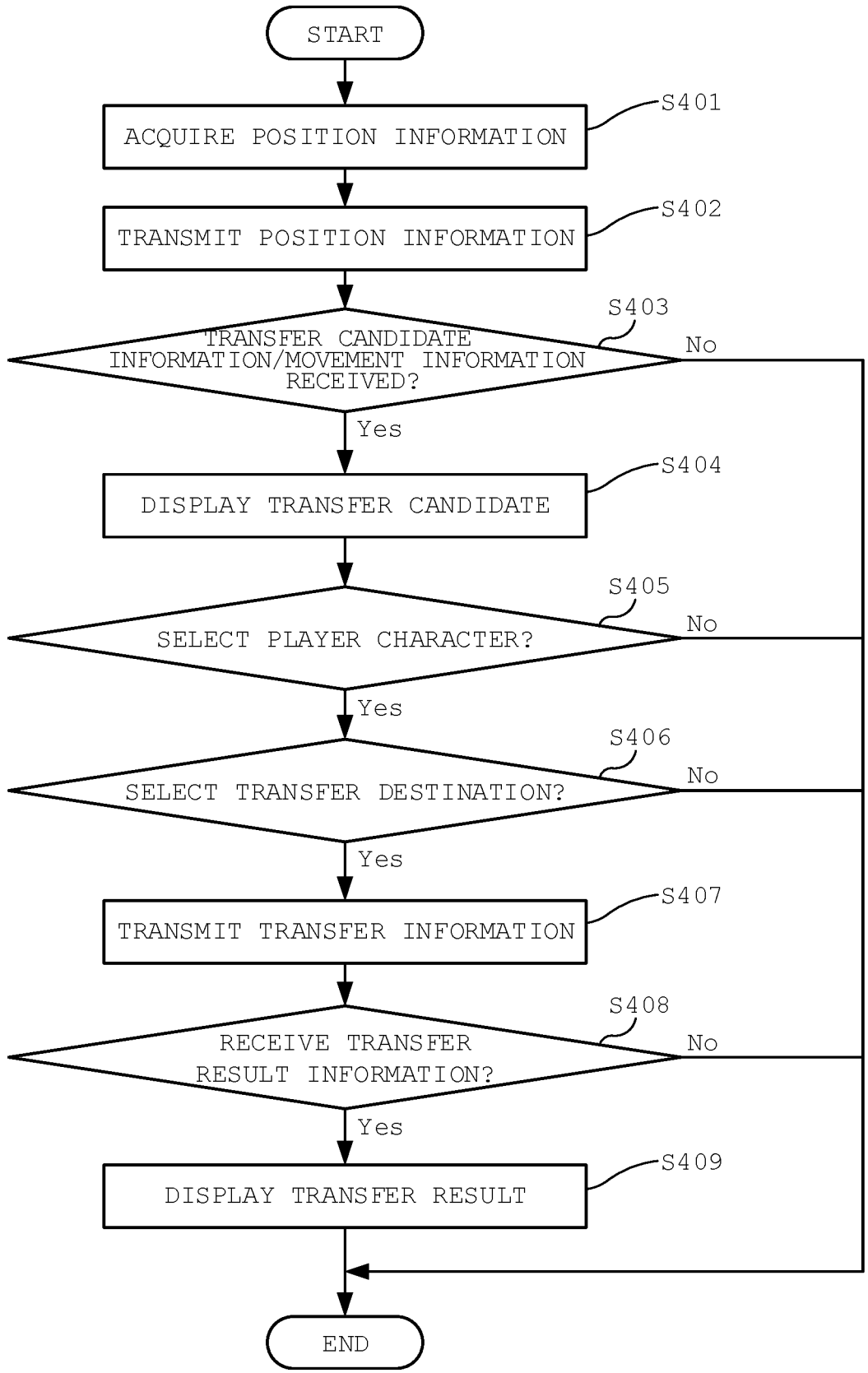
FIG. 10 is a diagram illustrating a flow of processing executed by the terminal device according to the first embodiment of the present disclosure.

FIG. 10 is a diagram illustrating a flow of processing executed by the terminal device 100 according to the first embodiment of the present disclosure. Specifically, a flow of processing is illustrated in which the processor 112 of the terminal device 100 periodically reads and executes the program stored in the memory 119, in each step between the acquisition of the position information in the terminal device 100-1 and displaying of the transfer result information in the sequence of the processing illustrated in FIG. 6. In particular, processing executed when the player character C1 of the player A has transferred to any of the candidate characters will be described below.

According to FIG. 10, the processor 112 of the terminal device 100 acquires position information about the terminal device 100 detected by the sensor 113 (S401). Then, the processor 112 stores the acquired position information in the memory 119 in association with the player ID of the player A, and transmits the position information stored in the memory 119 together with the player ID to the server apparatus 200 (S402).

Next, the processor 112 determines whether information about a candidate character to be a transfer candidate of the player character C1 (transfer candidate information) and/or movement information is received from the server apparatus 200 (S403). According to the number of other players located in the area A1 identified based on the transmitted position information, the transfer character as the transfer candidate may include any of information about player characters of other players and information about non-player characters. Specifically, the appearance coefficient is calculated while taking into consideration the coefficient (N) according to the number of other players located in the area A1, the coefficient (L) according to the level of the player A, the coefficient according to the extracted random number, and the like. Then, when the appearance coefficient exceeds the predetermined value, the number of other players suitable as transfer destinations around the player A is likely to be small. Thus, as a relief for this situation, a non-player character appears in the area A1 in the virtual space. Therefore, in this case, the transfer candidate information at least includes information about the non-player character. On the other hand, when the appearance coefficient does not exceed the predetermined value, the number of other players suitable as transfer destinations around the player A is likely to be small. Thus, the non-player character does not need to appear. Therefore, in this case, the transfer candidate information only includes information about the player characters of the other players.

Upon receiving the transfer candidate information from the server apparatus 200, the processor 112 puts a candidate character as a transfer destination candidate in the virtual space and controls the display 111 to display the virtual space (S404).

Figure 11A:
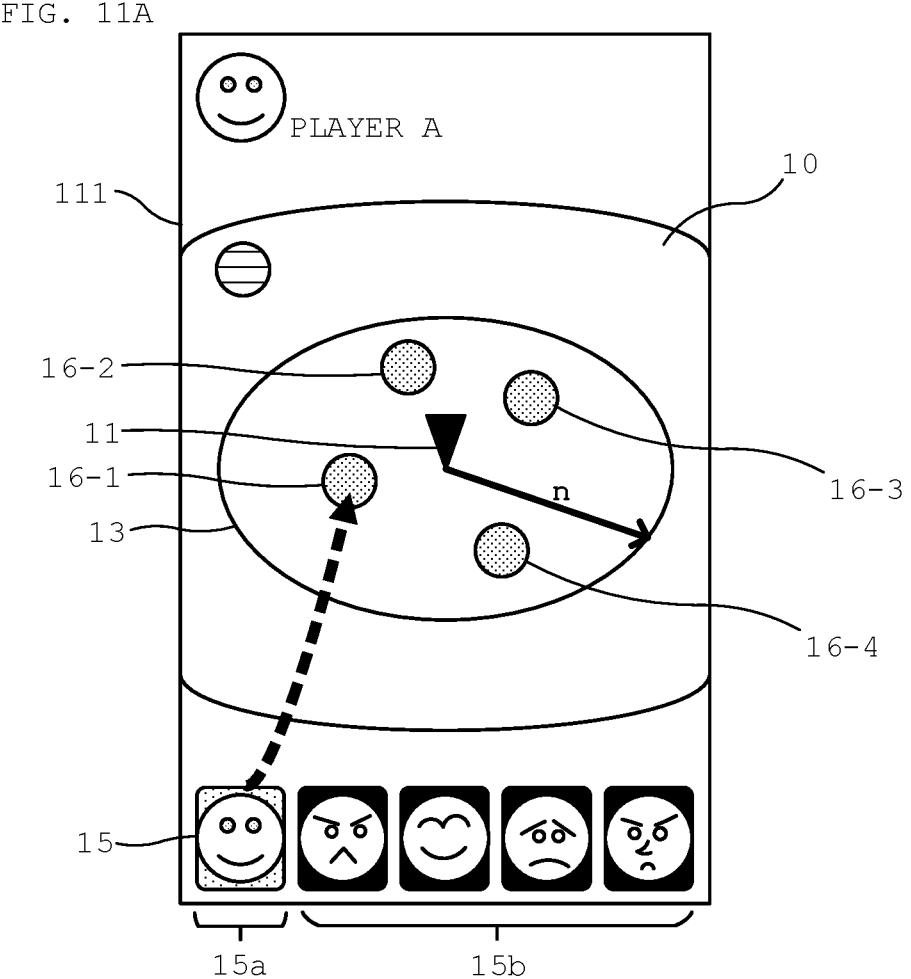
FIG. 11A is a diagram illustrating an example of a screen displayed on a display of the terminal device according to the first embodiment of the present disclosure.

Here, FIGS. 11A and 11B are diagrams illustrating examples of screens displayed on the display 111 of the terminal device 100 according to the first embodiment of the present disclosure. Specifically, FIG. 11A illustrates an example of a screen displayed when the transfer candidate information only includes player characters of other players. According to FIG. 11A, display 11 indicating the position of the player A is arranged in the virtual space 10 in association with the current location of the player A in the real space. Furthermore, among the other players located in the area A1 identified based on the position information about the player A, player characters 16-1 to 16-4 of the other players located within a range of a distance n from the current location of the player A are arranged in a virtual space 10 in association with coordinates in the real space. Since the non-player character is not included in the transfer candidate information, the non-player character is not arranged in the virtual space 10.

On the other hand, FIG. 11B illustrates an example of a screen displayed when the transfer candidate information at least includes information about a non-player character. According to FIG. 11B, the display 11 indicating the position of the player A is arranged in the virtual space 10 in association with the current location of the player A in the real space. Furthermore, among the other players located in the area A1 identified based on the position information about the player A, a player character 16 of another player located within a range of a distance n from the current location of the player A is arranged in a virtual space 10 in association with coordinates in the real space. Here, in the example illustrated in FIG. 11B, since only the player corresponding to the player character 16 exists as the other player located in the area A1, non-player characters 18-1 to 18-3 appear and are arranged in the virtual space 10.

Referring back to FIG. 10, the processor 112 selects a player character to be transferred to the candidate character from one or a plurality of player characters stored in the memory 119 as his or her player characters, in accordance with an instruction input from the player on the input interface 120 (S405). The processor 112 selects a candidate character to be the transfer destination of the player character selected in S405 from candidate characters included in the transfer destination information received, in accordance with an instruction input from the player on the input interface 120 (S406). The processor 112 performs control to transmit the transfer information to the server apparatus 200. The transfer information includes information for identifying the player character selected and information for identifying the candidate character to be the transfer destination (S407).

Reference is again made to FIGS. 11a and 11b. According to FIG. 11A, player characters 15a and 15b associated with the player A are displayed on a player character tray 15. Then, by detecting a tap operation input on the player character 15a by the player A with the input interface 120 (for example, the touch panel 121), the player character to be transferred is selected. Then, when a drag operation by the player A is detected with the input interface 120, a candidate character to be the destination of the transferring is selected from the plurality of candidate characters 16-1 to 16-4 displayed as the transfer destinations.

According to FIG. 11B, the player characters 15a and 15b associated with the player A are displayed on the player character tray 15. Then, by detecting a tap operation input on the player character 15a by the player A with the input interface 120 (for example, the touch panel 121), the player character to be transferred is selected. Then, when a drag operation by the player A is detected with the input interface 120, a candidate character to be the destination of the transferring is selected from the plurality of candidate characters 16 and 18-1 to 18-3 displayed as the transfer destinations.

Referring back to FIG. 10, the processor 112 determines whether the transition result information has been received from the server apparatus 200 (S408), and the processor 112 performs control so that a content corresponding to the received transfer result information is displayed on the display 111 (S409). Then, the processor 112 ends the series of processing.

Figure 12:
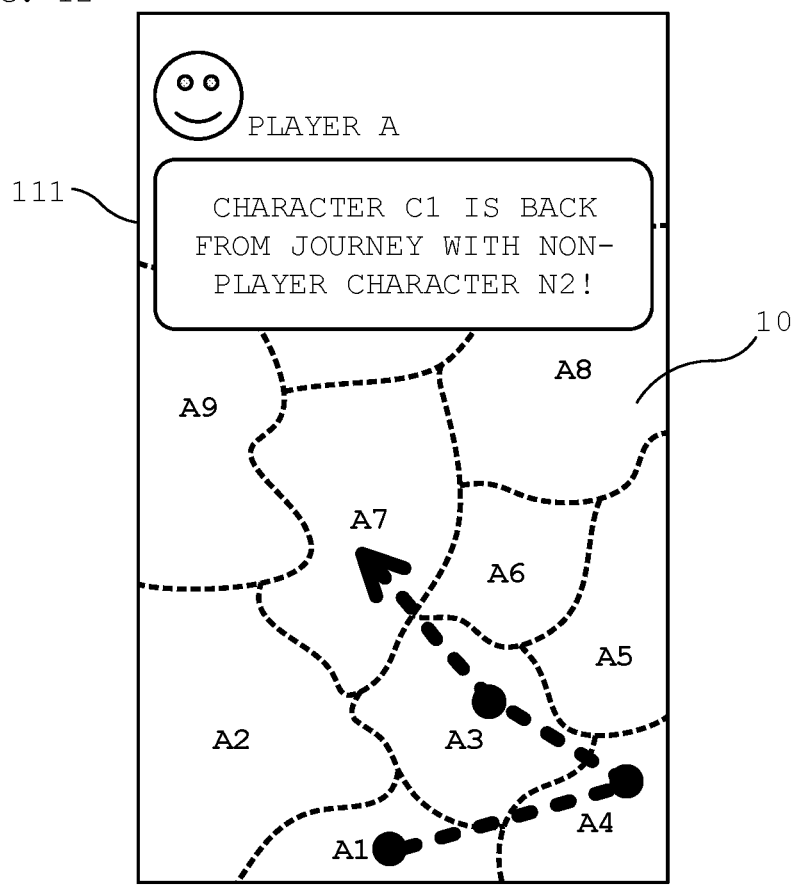
FIG. 12 is a diagram illustrating an example of a screen displayed on the display of the terminal device according to the first embodiment of the present disclosure.

Here, FIG. 12 is a diagram illustrating an example of a screen displayed on the display 111 of the terminal device 100 according to the first embodiment of the present disclosure. Specifically, FIG. 12 illustrates information indicating a history of movement by the player character C1, included in the received transfer result information. According to FIG. 12, the player character C1 is associated with the non-player character N2, that is, transferred so as to move through areas A1, A4, A3, and A7 in this order in accordance with the movement of the non-player character N2 in the virtual space 10. When the transfer destination is a non-player character, the movement destination is selected while taking a predetermined condition into consideration. For example, by referring to the position information of the player possessing the player character C1 associated with the non-player character N2, a movement destination is selected from areas that are within a predetermined distance from the area including the player and that of a predetermined quantity or less or involve a predetermined number of times of moving between areas or less. In addition to these conditions, the number of other players in the area on the virtual space to be the movement destination can be taken into consideration for the selection of the movement destination area. For example, in a case that movement to an area with a large number of other players is prioritized, with the movement to an area with a large number of other players is made when transfer to a new candidate character other than the non-player character N1 is made in the destination of the movement, a player character associated with the other player can be added as a candidate character.

Figure 13:
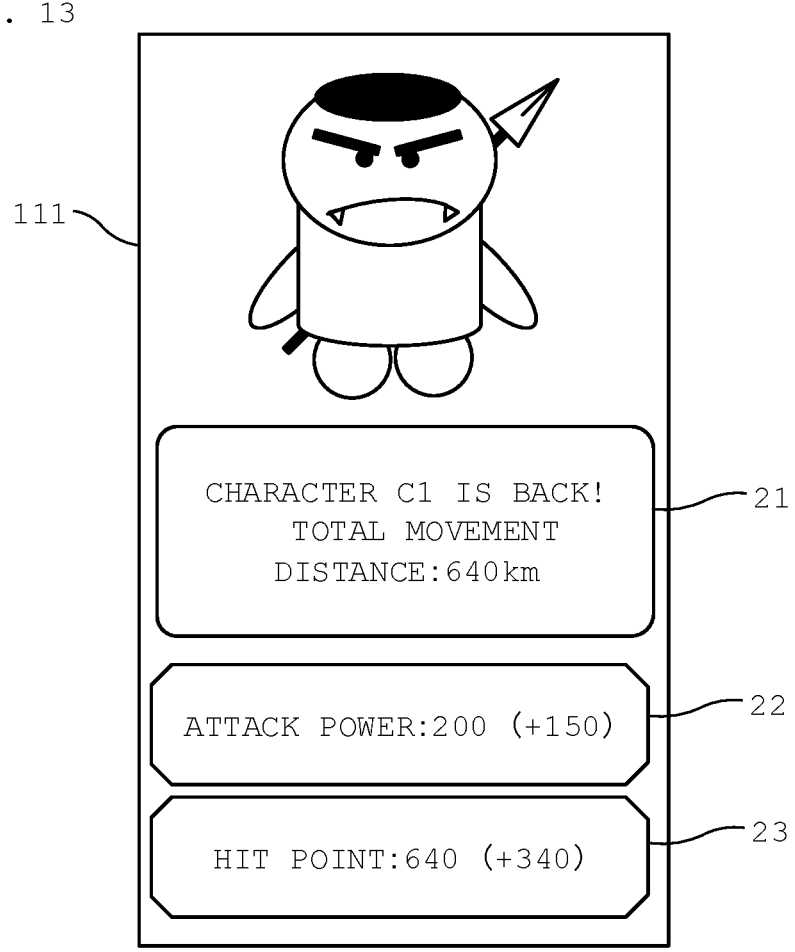
FIG. 13 is a diagram illustrating an example of a screen displayed on the display of the terminal device according to the first embodiment of the present disclosure.

FIG. 13 is a diagram illustrating an example of a screen displayed on the display 111 of the terminal device 100 according to the first embodiment of the present disclosure. Specifically, FIG. 13 illustrates information indicating a reward given in accordance with a movement by the player character C1, included in the received transfer result information. According to FIG. 13, a display 17 indicating that the transfer has ended is provided together with the entire image of the player character C1 that is the player character of the player A. The display being provided includes information about the total movement distance of the player character C1 moving on the virtual space together with the non-player character N2. Furthermore, the information about ability values of the player character C1 is displayed that includes ability values after the change as well as their incremented amounts.

The processing related to the transfer to the non-player character, that is, processing related to the association to the non-player character, described with reference to FIGS. 6 and 7 to 10, is typically executed in the transfer 1 illustrated in FIG. 1A. However, it is a matter of course that the present invention is not limited to this, and the processing related to the transfer to the non-player character, that is, processing related to the association to the non-player character may be applied to any of the transfers 2 to 4.

As described above, in the present embodiment, it is possible to execute a new application that cooperates with another player, by using the position information of the player. Specifically, in an application that progresses using player characters of other players, when the number of other player characters is small, the non-player character appears in the virtual space as a relief. Thus, the application can be executed without spoiling the feature of the game.

Other Embodiments

In the first embodiment, an area (for example, a municipality, a prefecture, and the like) on the real space where the player is positioned is identified from the position information about the player, and determination of whether to make a non-player character appear in the virtual space is made by using the number of other players included in the area identified. However, the present invention is not limited to this, and the number of other players included within a predetermined distance from the position of the player in the real space may be used for example.

Also, in the first embodiment, an example of an application that progresses by transferring the player character of the player has been described. However, the application according to the present disclosure may be applied to any application that progresses together with other players positioned in the periphery by using position information, such as an application involving exchange of an item with another player, an application involving a battle with another player, an application involving communication with the other players, for example. Specifically, for example, in an application in which an incentive can be obtained by giving virtual items owned by a player to other players located in the periphery, if there are few other players to give the item, there will be less opportunity to obtain an incentive. To provide a relief for this decreased opportunity, a non-player character appears on the virtual space. Thus, an incentive can be given to the player executing processing of giving a virtual item to the non-player character.

Further, in the first embodiment, the "player character" is described as an example of the "item" transferred to another player, but the item is not limited to the "character" item only. For example, equipment items of characters, various advertisement contents, pay video contents, and the like, displayed by game applications, SNS applications, and so on can also be used as "items".

In the first embodiment, the movement destination, movement route, movement time, and the like of the non-player character are determined in advance by the server apparatus 200 by a method such as lottery when the movement of the non-player character is determined. However, the present invention is not limited to this, and information such as the movement destination may be determined after the non-player character has been selected by the terminal device 100 as the transfer destination. In addition, the information may be determined by the terminal device 100 or the server apparatus 200, through a method such as extraction each time a predetermined condition is satisfied. The condition includes each time inter-area movement occurs, each time a predetermined period of time elapses, and each time a movement by a predetermined distance occurs.

As described above, in these embodiments, it is possible to execute a new application that cooperates with another player, by using the position information of the player as in the first embodiment. Specifically, in an application that progresses using player characters of other players, when the number of other player characters is small, the non-player character appears in the virtual space as a relief. Thus, the application can be executed without spoiling the feature of the game.

It is also possible to configure the system by appropriately combining or replacing the elements described in the embodiments.

The processing and procedures described in this specification can be implemented not only by those explicitly described in the embodiments, but also by software, hardware, or a combination thereof. Specifically, the processing and procedures described in this specification are realized by implementing a logic corresponding to the processing on a medium such as an integrated circuit, volatile memory, non-volatile memory, magnetic disk, or an optical storage. The processing and procedures described in this specification can be implemented with the processing/procedure installed as a computer program and executed by various computers including the terminal device and the server apparatus.

Even though the processing and procedures described herein may be described as being performed by a single device, software, component, or module, such processing or procedures may be executed by a plurality of devices, a plurality of software elements, a plurality of components and/or a plurality of modules. Even though various pieces of information described in this specification are described as being stored in a single memory or storage unit, such information may be dispersed to be stored in a plurality of memories in a single device or in a plurality of memories distributed among a plurality of devices. Furthermore, the software and hardware elements described herein may be implemented by integrating them into fewer components or breaking them down into more components.

The terminal device, program, method, and system being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A terminal device comprising:
an input interface configured to receive an instruction input from a first player in a real world;
a display configured to display a virtual space of a game application;
a memory configured to store computer readable instructions, player character information about one or a plurality of player characters including a first player character operable by the first player;
a sensor configured to detect position information about a first position of the terminal device held by the first player in the real world;
a communication interface configured to transmit the detected position information to a server apparatus remotely arranged from the terminal device; and
a processor configured to execute the computer readable instructions so as to:
transmit the detected position information corresponding to the first position to the server apparatus via the communication interface, the server apparatus being configured to receive other position information corresponding to other terminal devices held by other players so as to identify the other terminal devices that are located within a predetermined distance from the terminal device held by the first player in the real world, the other terminal devices including another terminal device held by a second player as one of the other players;
receive candidate character information about at least one of a plurality of other player characters corresponding to the other terminal devices held by the other players from the server apparatus via the communication interface when the server apparatus determines that the other terminal devices corresponding to the at least one of the plurality of other player characters are located within the predetermined distance from the first terminal device in the real world;

select a desired player character from the at least one of the plurality of other player characters in response to the instruction input received by the input interface, the desired player character being a second player character corresponding to the second player holding the another terminal device when the another terminal device is located within the predetermined distance from the first terminal device in the real world;

send the second player character as the selected desired player character to the server apparatus via the communication interface, the server apparatus associating the first player character with the second player character;

display the first player character associated with the second player character, the second player character, and the at least one of the plurality of other player characters in the virtual space on the display, the first player character associated with the second player character and the second player character moving in the virtual space as the second player holding the another terminal device moves in the real world, the movement of the first player character associated with the second player character in the virtual space having no direct relationship with movement of the first player and the other players in the real world;

receive the first player character upon dissolving the association between the first and second player characters by the server apparatus when a predetermined period of time passes since the first player character is associated with the second player character; and receive a new property of the first player character from the server apparatus, the new property being determined based on a moving distance of the second player holding the another terminal device in the real world while the first player character is associated with the second player character in the virtual space.

2. The terminal device according to claim 1,
wherein the memory is further configured to store a non-player character, the non-player character is movable in the virtual space, and the movement of the non-player character has no direct relationship with the movement of the first player and the other players in the real world, the processor is further configured to:
  receive the candidate character information about the non-player character from the server apparatus via the communication interface when the server apparatus determines that a number of the other terminal devices corresponding to the at least one of the plurality of other player characters that are located within the predetermined distance from the first terminal device in the real world satisfies a predetermined condition;
  display the first player character associated with the non-player character, the non-player character, and the at least one of the plurality of other player characters in the virtual space on the display, the first player character associated with the non-player character moving in the virtual space, the movement of the first player character associated with the non-player character in the virtual space having no direct relationship with the movement of the first player and the other players in the real world;
  receive the first player character upon dissolving the association between the first player character and the non-player character by the server apparatus when a predetermined period of time passes since the first player character is associated with the non-player character; and
  receive another property of the first player character from the server apparatus, the another property being determined based on a moving distance of the first player character associated with the non-player character in the virtual space.

3. The terminal device according to claim 1,
wherein the virtual space includes a plurality of areas associated with a real space in the real world.

4. The terminal device according to claim 3,
wherein a movement destination of the movement of the first player character associated with the second player character in the virtual space is selected from the plurality of areas under a predetermined condition.

5. The terminal device according to claim 4,
wherein the predetermined condition relates to a distance in the real space associated with the virtual space.

6. The terminal device according to claim 4,
wherein the predetermined condition relates to a predetermined range of a distance from a current position of the second player character corresponding to the second player holding the another terminal device.

7. The terminal device according to claim 1,
wherein a movement destination of the movement of the first player character associated with the second player character in the virtual space is selected in accordance with a number of the other players holding the other terminal devices.

8. The terminal device according to claim 1,
wherein the movement of the first player character associated with the second player character in the virtual space ends upon reaching a movement destination selected under a predetermined condition.

9. The terminal device according to claim 1,
wherein the first player character associated with the second player character moves to a different area in a plurality of areas, in the virtual space, associated with a real space in the real world, once in every predetermined period of time.

10. A computer program product embodying computer readable instructions stored on a non-transitory computer-readable storage medium for causing a computer to execute a process by a processor so as to perform the steps of:
  detecting a plurality of position information of a plurality of terminal devices held by a plurality of players in a real world, each of the plurality of position information corresponding to a location in the real world where each of the plurality of terminal devices held by each of the plurality of players is located, the plurality of terminal devices including a first terminal device held by a first player of the plurality of players and other terminal devices held by other players of the plurality of players, the other terminal devices including a second terminal device held by a second player as one of the other players;
  identifying the other players holding the other terminal devices that are located within a predetermined distance from the first terminal device in the real world in response to the plurality of detected position information of the first terminal device and the other terminal devices;
transmitting candidate character information about at least one of a plurality of other player characters corresponding to the identified other players to the first terminal device when the identified other terminal devices corresponding to the at least one of the plurality of other player characters are located within the predetermined distance from the first terminal device in the real world;
receiving selected player character information about a second player character corresponding to the second player holding the second terminal device when the second terminal device is located within the predetermined distance from the first terminal device in the real world, the second player character being selected by the first player from the at least one of the plurality of other player characters;
associating a first player character corresponding to the first player holding the first terminal device with the second player character;
displaying the first player character associated with the second player character, the second player character, and the at least one of the plurality of other player characters in a virtual space of a game application on a display, the first player character associated with the second player character and the second player character moving in the virtual space as the second player holding the second terminal device moves in the real world, the movement of the first player character associated with the second player character in the virtual space having no direct relationship with movement of the first player and the other players in the real world;
determining a moving distance of the second player holding the second terminal device in the real world while the first player character is associated with the second player character in the virtual space;
dissolving the association between the first and second player characters and re-associating the first player character with the first player when a predetermined period of time passes since the first player character is associated with the second player character; and
changing a property of the first player character based on the determined moving distance of the second player holding the second terminal device in the real world while the first player character is associated with the second player character in the virtual space.

11. A method for causing a processor in a computer to execute a process, the method comprising executing on the processor the steps of:
detecting a plurality of position information of a plurality of terminal devices held by a plurality of players in a real world, each of the plurality of position information corresponding to a location in the real world where each of the plurality of terminal devices held by each of the plurality of players is located, the plurality of terminal devices including a first terminal device held by a first player of the plurality of players and other terminal devices held by other players of the plurality of players, the other terminal devices including a second terminal device held by a second player as one of the other players;
identifying the other players holding the other terminal devices that are located within a predetermined distance from the first terminal device in the real world in response to the plurality of received position information of the first terminal device and the other terminal devices;
transmitting candidate character information about at least one of a plurality of other player characters corresponding to the identified other players to the first terminal device when the identified other terminal devices corresponding to the at least one of the plurality of other player characters are located within the predetermined distance from the first terminal device in the real world;
receiving selected player character information about a second player character corresponding to the second player holding the second terminal device when the second terminal device is located within the predetermined distance from the first terminal device in the real world, the second player character being selected by the first player from the at least one of the plurality of other player characters;
associating a first player character corresponding to the first player holding the first terminal device with the second player character;
displaying the first player character associated with the second player character, the second player character, and the at least one of the plurality of other player characters in a virtual space of a game application on a display, the first player character associated with the second player character and the second player character moving in the virtual space as the second player holding the second terminal device moves in the real world, the movement of the first player character associated with the second player character in the virtual space having no direct relationship with movement of the first player and the other players in the real world;
determining a moving distance of the second player holding the second terminal device in the real world while the first player character is associated with the second player character in the virtual space;
dissolving the association between the first and second player characters and re-associating the first player character with the first player when a predetermined period of time passes since the first player character is associated with the second player character; and
changing a property of the first player character based on the determined moving distance of the second player holding the second terminal device in the real world while the first player character is associated with the second player character in the virtual space.

12. A server apparatus comprising:
a communication interface configured to receive a plurality of position information of a plurality of terminal devices held by a plurality of players in a real world, each of the plurality of position information corresponding to a location in the real world where each of the plurality of terminal devices held by each of the plurality of players is located, the plurality of terminal devices including a first terminal device held by a first player of the plurality of players and other terminal devices held by other players of the plurality of players, the other terminal devices including a second terminal device held by a second player as one of the other players;
a memory configured to store computer readable instructions, the plurality of received position information, and player character information about a plurality of player characters operable by the plurality of players in a virtual space of a game application, the plurality of player characters including a first player character and a plurality of other player characters corresponding to the first player and the other players, respectively, the plurality of other player characters including a second player character corresponding to the second player; and a processor configured to execute the computer readable instructions so as to:

identify the other players holding the other terminal devices that are located within a predetermined distance from the first terminal device in the real world in response to the plurality of position information of the first terminal device and the other terminal devices received via the communication interface;

transmit candidate character information about at least one of the plurality of other player characters corresponding to the identified other players to the first terminal device when the identified other terminal devices corresponding to the at least one of the plurality of other player characters are located within the predetermined distance from the first terminal device in the real world;

receive selected player character information about the second player character selected by the first player from the at least one of the plurality of other player characters when the second terminal device is located within the predetermined distance from the first terminal device in the real world;

associate the first player character with the received second player character;

display the first player character associated with the second player character, the second player character, and the at least one of the plurality of other player characters in the virtual space on a display, the first player character associated with the second player character and the second player character moving in the virtual space as the second player holding the second terminal device moves in the real world, the movement of the first player character associated with the second player character in the virtual space having no direct relationship with movement of the first player and the other players in the real world;

determine a moving distance of the second player holding the second terminal device in the real world while the first player character is associated with the second player character in the virtual space;

dissolve the association between the first and second player characters and re-associate the first player character with the first player when a predetermined period of time passes since the first player character is associated with the second player character; and change a property of the first player character based on the determined moving distance of the second player holding the second terminal device in the real world while the first player character is associated with the second player character in the virtual space.

* * * * *